(12) United States Patent
Girault et al.

(10) Patent No.: US 6,379,480 B1
(45) Date of Patent: Apr. 30, 2002

(54) METHOD FOR OBTAINING THIN, LIGHT AND RIGID METAL PARTS

(75) Inventors: Daniel Georges Girault, Melun; Gérard Philippe Gauthier, Saint Michel sur Orge; Ludovic Edmond Camille Molliex, Brunoy, all of (FR)

(73) Assignee: Societe National d'Etude et de Construction de Moteurs d'Aviation "snecma", Paris (FR)

( * ) Notice: Subject to any disclaimer, the term of this patent is extended or adjusted under 35 U.S.C. 154(b) by 0 days.

(21) Appl. No.: 09/581,183
(22) PCT Filed: Oct. 15, 1999
(86) PCT No.: PCT/FR99/02515
  § 371 Date: Jun. 15, 2000
  § 102(e) Date: Jun. 15, 2000
(87) PCT Pub. No.: WO00/21746
  PCT Pub. Date: Apr. 20, 2000

(30) Foreign Application Priority Data

Oct. 15, 1998 (FR) .............................. 98 12917

(51) Int. Cl.[7] .............................. B21K 3/04
(52) U.S. Cl. ............ 148/521; 148/527; 29/889.2; 29/889.71; 228/193
(58) Field of Search ............ 148/521, 527; 29/889.2, 889.71, 889.72, 458; 228/193

(56) References Cited

U.S. PATENT DOCUMENTS

| | | | | |
|---|---|---|---|---|
| 4,469,757 A | * | 9/1984 | Ghosh et al. | 428/614 |
| 4,529,452 A | * | 7/1985 | Walker | 148/527 |
| 5,429,877 A | * | 7/1995 | Eylon | 428/586 |
| 5,457,884 A | * | 10/1995 | Fowler et al. | 29/889.72 |
| 5,745,994 A | * | 5/1998 | Honnorat | 29/889.2 |
| 6,190,133 B1 | * | 2/2001 | Ress et al. | 416/229 A |

* cited by examiner

Primary Examiner—George Wyszomierski
(74) Attorney, Agent, or Firm—Oblon, Spivak, McClelland, Maier & Neustadt, P.C.

(57) ABSTRACT

The invention concerns a method for producing parts made of thin, light and rigid metal alloy essentially having the following steps: producing a core having the part shape; producing cavities in the core; producing shells made of metal alloy combined with reinforcing fibers with high modulus of elasticity; densifying the shells; and diffusion welding of the shells on the core by compression at temperature and pressure conditions for isothermal forging of the metal alloy used.

9 Claims, 2 Drawing Sheets

METHOD FOR OBTAINING THIN, LIGHT AND RIGID METAL PARTS

BACKGROUND OF THE INVENTION

1. Technical Field of the Invention

The invention relates to a process for manufacturing metal parts with a sandwich structure. The metal parts are reinforced by fibers having a high elastic modulus and are joined together by diffusion bonding.

2. Description of the Related Art

Thin and lightweight parts made of metal alloys having a high strength/mass ratio, i.e. mainly aluminum, magnesium and titanium alloys, are used in aeronautics. In the case of turbomachines, these parts are typically casings, casing arms and blade assemblies. However, such alloys have the drawback of having a low Young's modulus and the parts made with these alloys must consequently be strengthened by ribs so as to provide sufficient rigidity. The presence of these ribs however has the drawback of increasing the mass of the part. In addition, these ribs may have complex shapes and it may consequently become very expensive to produce them.

Composites consisting of reinforcing fibers embedded in a metal matrix are also used at the present time in aeronautics, the fibers possibly being made of silicon carbide (SiC), of boron or of carbon and the matrix made of aluminum, magnesium and titanium alloy. Such materials have mechanical properties that are substantially improved over the same matrix alloy used alone. By way of example, if a composite consisting of silicon carbide fibers embedded in a Ta6V titanium alloy matrix is compared with the Ta6V titanium alloy used alone, it is found that the mechanical strength is increased by 120%, the Young's modulus is increased by 100% while the density is reduced by 15%.

Metal matrix composite are obtained essentially by strongly compressing, at the superplastic forming temperature of the metal alloy, a preform consisting of reinforcing fibers and a metal alloy, the fibers possibly being woven or wound and the metal alloy possibly being in the form of foils placed between the fibers, in the form of a coating applied around the fibers by the process called "physical vapor deposition" or "PVD", the metal alloy also possibly being applied by plasma spraying onto the woven or wound fibers. Hot pressing may be carried out in a die in a press when the shape of the part allows this pressing, that is to say when it has a predominantly plane shape. Otherwise, the pressing can also be carried out in an autoclave, the part then being surrounded by a container, that is to say a sealed metal shell in which a vacuum is created, the part also possibly being pressed against a former. Such processes allow thin composite parts to be produced which have improved mechanical properties compared with the same part made of metal alloy. However, the use of these processes for producing large parts throughout their thickness would require the use of a large quantity of fiber, whereas only the fibers at the surface of the part are contributing to the stiffness of this part according to a principle well known in the strength of materials. Thus, because the cost of purchasing and of using these high-strength fibers is very high, the manufacturing cost of such parts would be prohibitive.

Hybrid parts are also produced to comprise a fiber/metal alloy composite part and a part made of metal alloy alone. To manufacture such pieces, a blank of the second part is machined and the first and second parts are pressed together using the aforementioned general process, this hot pressing bonding the two parts together by mutual diffusion of the alloy of each part into the other part.

In general, the constructing and the hot pressing of a part made of a composite, comprising reinforcing fibers having a high elastic modulus embedded in a matrix made of a metal alloy, remain difficult operations since these fibers cannot withstand large curvatures without breaking, because of their high elastic modulus. Since the pressures required both for the densification and for the diffusion bonding are very high, in order for the fibers not to break, the following conditions are usually satisfied:

- the fibers are arranged uniformly in plies, one beside another in a parallel manner;
- during densification, the process must allow the matrix to flow very homogeneously around the fibers so as not to cause, due to the effect of the pressure, localized displacements of the fibers in which there would be a risk of breaking them.

By way of example, the pressing and diffusion bonding of a composite consisting of reinforcing fibers made of silicon carbide with a matrix made of Ta6V titanium alloy require a pressure of 600 to 800 bars at a temperature of about 900° C.

SUMMARY OF THE INVENTION

The invention provides process for producing thin and rigid metal parts, said process comprising in particular the following operations:

- production of a core made of a metal alloy;
- application, to each face of the core, of a shell made of a composite which includes reinforcing fibers embedded in a metal alloy, said fibers having an elastic modulus at least equal to four times that of the metal alloy;
- densification of the shells by pressing at least in the thickness direction at the superplasticity temperature of the metal alloy surrounding the fibers; and
- diffusion bonding of the shells to the core by pressing at least in the thickness direction at the diffusion temperature of the metal alloys of the shells and of the core.

Such a process is noteworthy in that:

- a plurality of emerging cavities is produced in the core on at least one face of the core, for example by drilling, by electrical discharge machining or by punching, with a lowest possible volume fraction of the core, for example 0.9, the volume fraction of the core being the ratio $V/V_c$ in which $V_c$ is the volume of the solid core and V is the volume of the remaining matrix of the core after the cavities have been produced, said cavities being uniformly distributed over the part; and
- the shells are densified to the shape of the core before they are applied to the core.

This process has the effect of forming, in the part of the cavities closed at least on one side by the shells with negligible creep of said shells into said cavities, and has the result of simultaneously lightening and stiffening the parts, without increasing their thickness.

The curvature of the reinforcing fibers is kept approximately constant above each cavity and in the vicinity of each cavity, thereby simultaneously preventing the fibers from breaking or allowing only a negligible proportion of them to break, and permitting these fibers to be maintained in the best position so as to strengthen and stiffen the part.

Thus, contrary to what may have been thought, it is possible to press, under the aforementioned conditions and without appreciable creep, into the cavities of the composite shells which consist of reinforcing fibers having a high elastic modulus embedded in a matrix made of a metal alloy, onto a core which itself comprises a multitude of cavities open at its surface, the prior densification of the shells making said shells stiff enough to limit their creep into the cavities to negligible values.

Advantageously, the metal alloys will be taken from the group comprising titanium, aluminum and magnesium, and the reinforcing fibers from the group comprising silicon carbide, boron and carbon, so as to combine a light metal alloy with reinforcing fibers having a high strength and a high elastic modulus.

In a first embodiment of the invention, the diffusion bonding is carried out in a die in the press, for example with a heating die or with a furnace press. Such an arrangement has the effect of keeping the average thickness of material between the cavities at a sufficient value compatible with the pressing process employed and has the result of preventing the core from collapsing during the pressing in a die.

In a preferred method of implementing the process, the shells are bonded to the core by isostatic pressing in an autoclave. The width of the cavities must then be limited to a value compatible with this type of pressing. The present process can then be applied to parts which are impossible to produce in a die, for example turbomachine casings. It will be understood that the pressure applied to the part by a fluid, in this case the gas of the autoclave, favors creep of the shells into the cavities. However, it has been found that this creep may be regarded as being negligible when the dimensions of the cavities remain less than a certain limit which depends on the properties of the composite shell, thereby allowing the manufacture of parts under these conditions of aeronautical or aerospace quality.

Advantageously, a minimum volume fraction of the core will be used so as to reduce the mass of the core and to lighten the parts of the same stiffness and strength.

Also advantageously, the volume fraction of the core $V/V_c$ will be increased in the vicinity of the regions for fastening the part. This has the effect of increasing the compressive strength of the part at these points and has the result of allowing the part to be bolted with high tightening torques. In one particular embodiment, the core will be solid in the immediate vicinity of said fastening members.

Advantageously, cavities touching each other may be machined in the core along suitable lines. This has the effect of forming ducts between the shells and has the result of allowing fluid to flow into the thickness of the part. This result is particularly beneficial in the case of structural parts of a turbomachine, such as the casings and the casing arms: it is thus possible to distribute lubricant, fuel or gas at various temperatures, especially in order to control the operating clearances.

Advantageously, these cavities touching one another each emerge only on one side of the core so as to maintain the cohesion of said core during production of the part.

Advantageously, when the part is a turbomachine blade assembly comprising a blade and a root at one end, the core extending into the blade and into the root, cavities with a reduced volume fraction of the core $V/V_c$ will be made in the core of the blade and, optionally, cavities with a high volume fraction of the core $V/V_c$ will be made in the root, thereby making it possible to produce very lightweight blade assemblies which will be able, however, to withstand high root embedment stresses. Advantageously, the blade assembly will be produced in a die, thereby allowing small volume fractions of the core and therefore a considerable weight saving.

DESCRIPTION OF THE DRAWINGS

The invention will be better understood and the advantages that it provides will be more clearly apparent in the light of a detailed embodiment and of the appended figures.

DETAILED DESCRIPTION OF THE INVENTION

Figure 1:
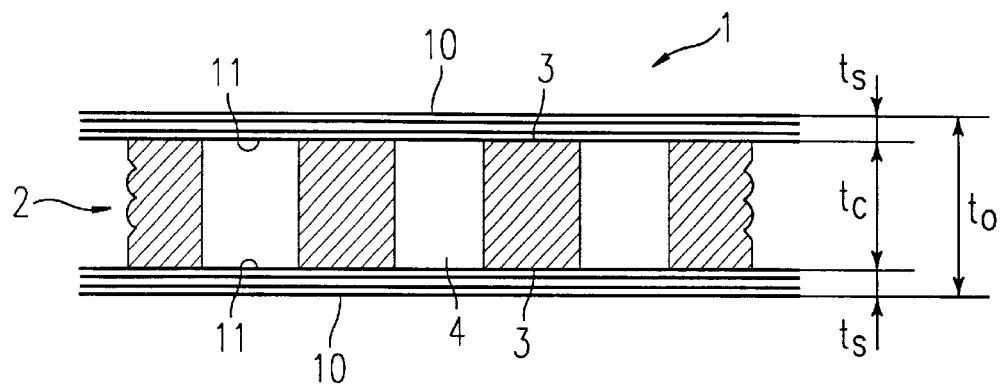
FIG. 1 illustrates, in a sectional view, a casing wall.
Figure 2:
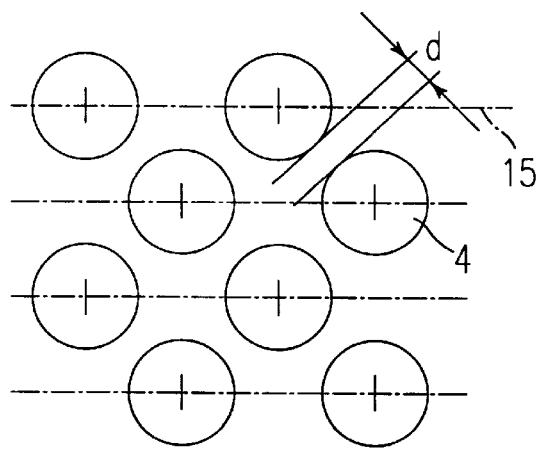
FIGS. 2 and 3 illustrate possible shapes of the cavities machined in the core.
Figure 3:
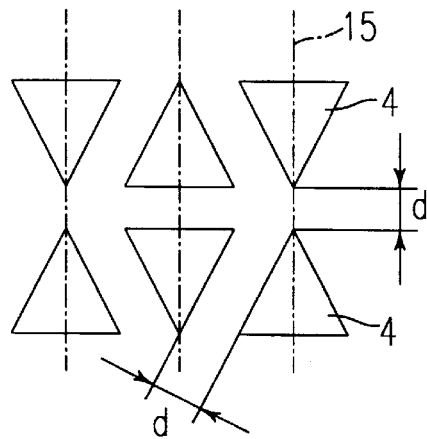

Reference will firstly be made to FIG. 1. A part 1 is thin and comprises a core 2 which is also thin and bounded in its thickness direction by two faces 3. The core 2 has a plurality of cavities 4 each emerging on at least one of the faces 3 of the core 2. In this example, the cavities 4 each emerge on both faces 3 of the core 2. A shell 10 is diffusion-bonded to each of the faces 3 of the core 2. Inner faces 11 of the shells 10 are the places where the diffusion bonding takes place. This diffusion bonding consists of a diffusional interpenetration of the material of the core 2 and of the shells 10 at the faces 3 and 11, which are in mutual contact, with the core 2 and the shells 10, respectively. It will be understood that the cavities 4 are closed by the shells 10. In practice, these cavities 4 will be cylindrical. In the example in FIG. 2, these cavities 4 have a circular cross section and are arranged in a staggered manner along approximately parallel lines 15, the distance d between a cavity 4 and each of its neighbors being approximately constant, at least locally, that is to say in a limited region. In the example in FIG. 3, the cavities 4 are triangular and placed back to back along approximately parallel lines 15, the vertices of the triangles of one line 15 being inverted with respect to the vertices of the triangles of the two neighboring lines 15, the distance d between the vertices and/or the sides of a triangle and of all the neighboring triangles being approximately constant. Moreover, the vertices of the triangles are rounded so as to reduce stress concentrations that could occur in the material of the core 2.

In this example, the core 2 is made of Ta6V titanium-based metal alloy and the shells are made of a composite consisting of silicon carbide reinforcing fibers embedded in a matrix also made of Ta6V titanium-based metal alloy.

The process is as follows:

Manufacture of the core 2 in the shape of the part 1, takes place for example by rolling, forging or machining; production of the cavities 4 occurs directly in the casting, or by drilling, punching or electrical discharge machining, the cavities 4 possibly being uniformly distributed over the part 1 and/or interrupted so as to reinforce locally the core 2 when there are, for example, points of application of loads or bosses; machining and pickling of the faces 3 of the core 2 then take place.

Manufacture of the shells 10 made of a metal matrix composite by a hot pressing operation (hot isostatic compacting or uniaxial pressing in a press, if necessary in a die), under temperature and pressure conditions allow this material to be densified using one of the standard techniques: fiber plus foil, reinforced monolayers, prepregs obtained by plasma, winding of fibers coated by PVD (Physical Vapor Deposition), or another equivalent process. Machining and pickling of the inner face 11 of the shells 10 then take place. These shells 10 have the required number of fiber layers for obtaining the mechanical strength and stiffness desired.

In order to join the shells 10 and the core 2 together by diffusion bonding, it is necessary:

to machine the faces 3 of the core 2, if necessary;

to clean, chemically pickle and rinse the faces 3 of the core 2 and the inner faces 11 of the shells 10, so as to prepare them for diffusion bonding; and to join the shells 10 to the core 2 and to place the assembly in a pressing tool or in a container capable of hot isostatic pressing in an autoclave, and to press it while complying with the pressure and temperature cycles appropriate to the alloys of which the core 2 and the matrix of the shells 10 are composed so as to diffusion-bond the shells 10 to the core 2.

Figure 4:
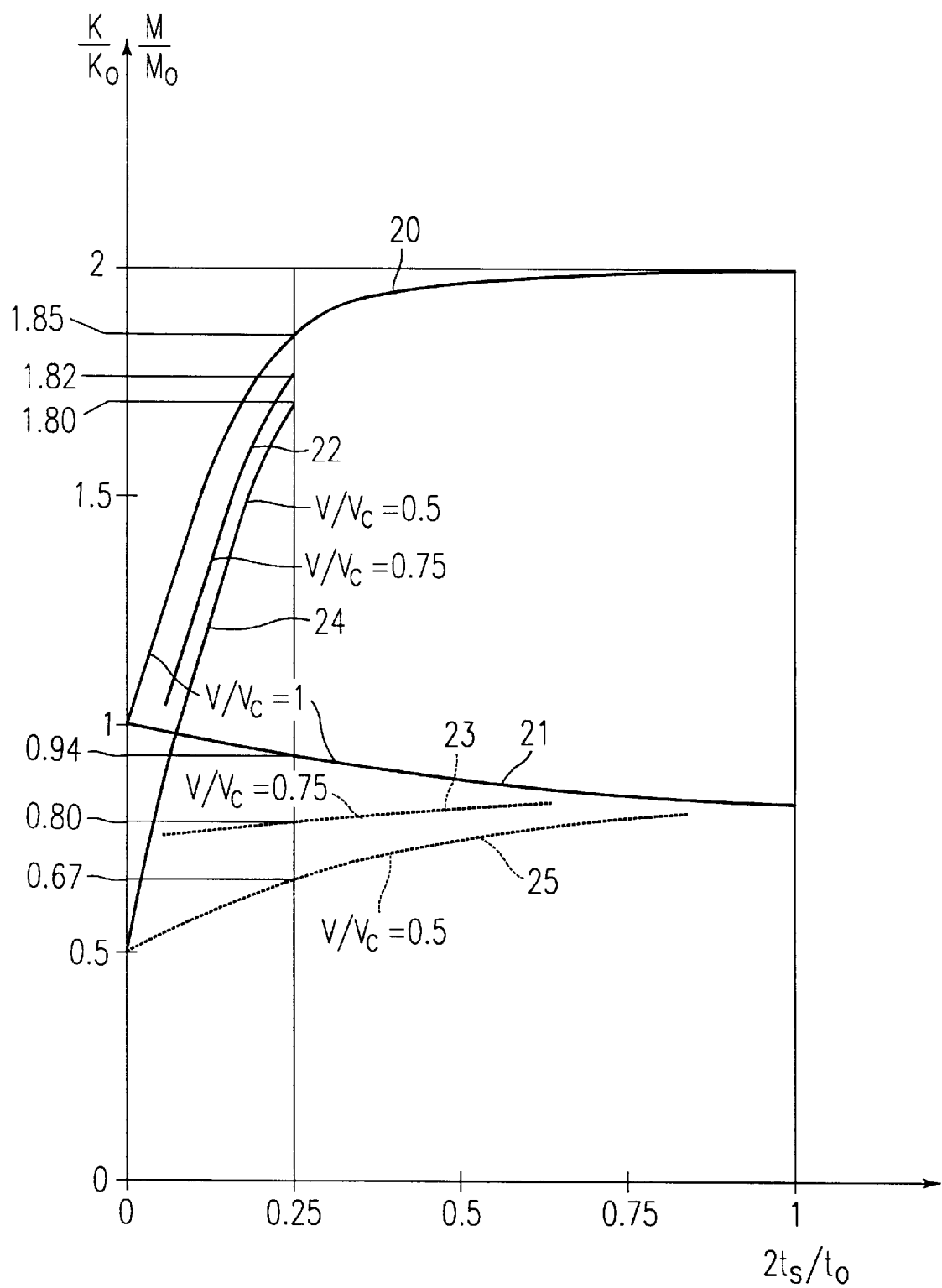
FIG. 4 illustrates in a graph the results obtained in the case of silicon carbide fibers and of a Ta6V titanium-based metal alloy.

Reference will be now be made simultaneously to FIGS. 1 and 4. Firstly, $t_o$ will denote the thickness of the part 1, $t_c$ the thickness of the core 2, $t_s$ the thickness of each shell 10, with the equation $t_o = 2t_s + t_c$. In addition, K will denote the stiffness of the part obtained with the preset process, $K_0$ is the stiffness of this same part 1 in monolithic form, that is to say all metal and without cavities 4, M is the mass of the part obtained with the present process and $M_0$ is the mass of the monolithic part. Finally, $V_c$ will denote the total volume of the core 2, V is the volume of material of the core 2 remaining after the cavities 4 have been produced and $V/V_c$ is the volume fraction of the core.

The x-axis of the graph shows the thickness fraction of the shells 10, i.e. $2t_s/t_o$, this fraction obviously only varying between 0 and 1.

Curves 20 and 21 show the variations in the ratios $K/K_0$ and $M/M_0$, respectively, as a function of the thickness fraction of the shells $2t_s/t_o$ for a volume fraction of the core $V/V_c=1$, that is say without cavities 4. Curves 22 and 23 show these same ratios for a volume fraction of the core $V/V_c=0.75$ and curves 24 and 25 show these same ratios for a volume fraction of the core $V/V_c=0.50$.

Curve 20 shows that the stiffness ratio $K/K_0$ may reach the maximum value 2 when the part is fibrous over its entire thickness, that is to say when the thickness fraction of the shells $2t_s/t_o$ is equal to 1. It is worthwhile pointing out that the stiffness ratio $K/K_0$ remains at 1.85 and that the corresponding mass ratio $M/M_0$ given by curve 21 drops to 0.94 when the thickness fraction of the shells $2t_s/t_o$ drops to 0.25. In other words, although each shell 10 occupies only 12.5% of the thickness of the part 1, the stiffness of the part is increased by 85% and its mass reduced by 6%.

It is worthwhile pointing out also that, by virtue of curves 24 and 25, the stiffness of the part is increased by 80% and its mass reduced by 33% when the core 2 is lightened by 50% and that each shell 10 occupies 12.5% of the thickness of the part 1, corresponding respectively to values of $K/K_0=1.8$, $M/M_O=0.67$, $V/V_0=0.5$ and $2t_s/t_o=0.25$. Curves 22 and 23 corresponding to a volume fraction of the core $V/V_c=0.75$ give, of course, an intermediate result.

What is claimed is:

1. Process for obtaining thin, lightweight and rigid metal parts, said process comprising the following steps:

producing a thin core made of a metal alloy;

applying, to each face of the core, a shell consisting of reinforcing fibers having an elastic modulus at least equal to four times that of the metal alloy, said reinforcing fibers being embedded in a matrix made of a matrix-forming metal alloy;

densifying the shells by pressing at least in the thickness direction at a superplasticity temperature of the metal alloy of the matrix; and diffusion-bonding of said shells to said core by pressing in the thickness direction of the part at an isothermal forging temperature of the metal alloy of the core and of the matrix of the shells;

wherein a plurality of cavities is produced in the core and emerge at least on one face of the core; and wherein the shells are densified to the shape of the core.

2. Process according to claim 1, wherein a metal alloy, selected from a group consisting of titanium-, magnesium- and aluminum-based alloys, is employed; and wherein the reinforcing fibers, selected from a group consisting of silicon carbide, boron and carbon, are employed, so as to combine a light metal alloy with reinforcing fibers having a high strength and a high elastic modulus.

3. Process according to claim 1 or 2, wherein the diffusion-bonding step is carried out by pressing in a die in a press.

4. Process according to claim 1 or 2, wherein the diffusion-bonding step is carried out by isostatic pressing in an autoclave.

5. Process according to claim 1 or 2, wherein a volume fraction of the core is increased in fastening regions of the part so as to increase compressive strength of the part in the fastening regions.

6. Process according to claim 5, wherein the core is produced to extend into a blade and into a root of the part and wherein the cavities are produced in the core of the blade with a reduced volume fraction of the core, said part being a turbomachine blade assembly.

7. Process according to claim 6, wherein the blade assembly is made in a die.

8. Process according to claim 1 or 2, wherein the cavities are produced in the core along lines so as to form ducts between the shells.

9. Process according to claim 8, wherein the cavities each emerge only on one side of the core, so as to maintain cohesion of said core during production of the part.

* * * * *